July 20, 1954

R. O. SCOFIELD 2,683,895

EXTRUDER

Filed July 21, 1950

Inventor
Robert O Scofield
by
Willits Hardman & Fehr
his attorneys

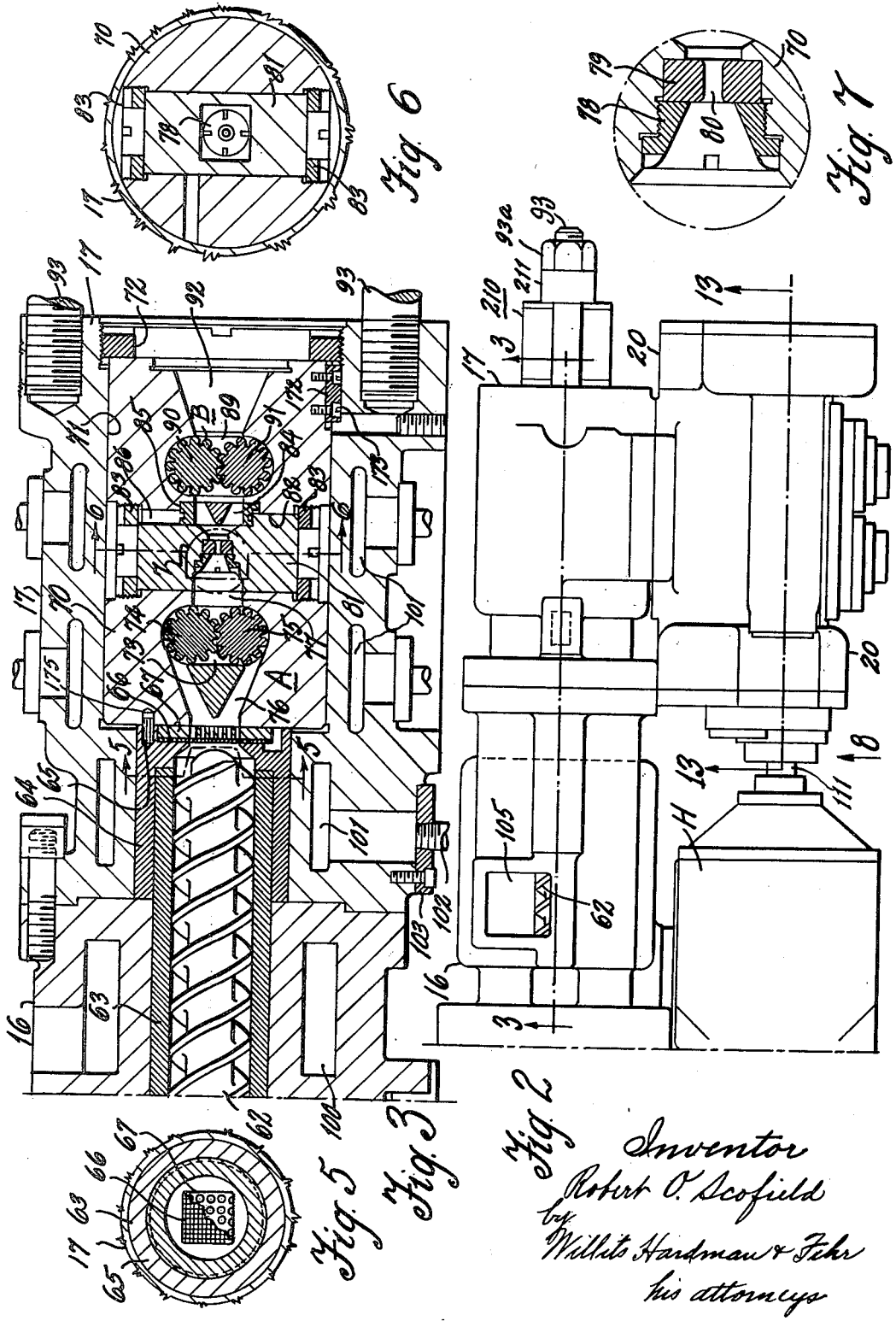

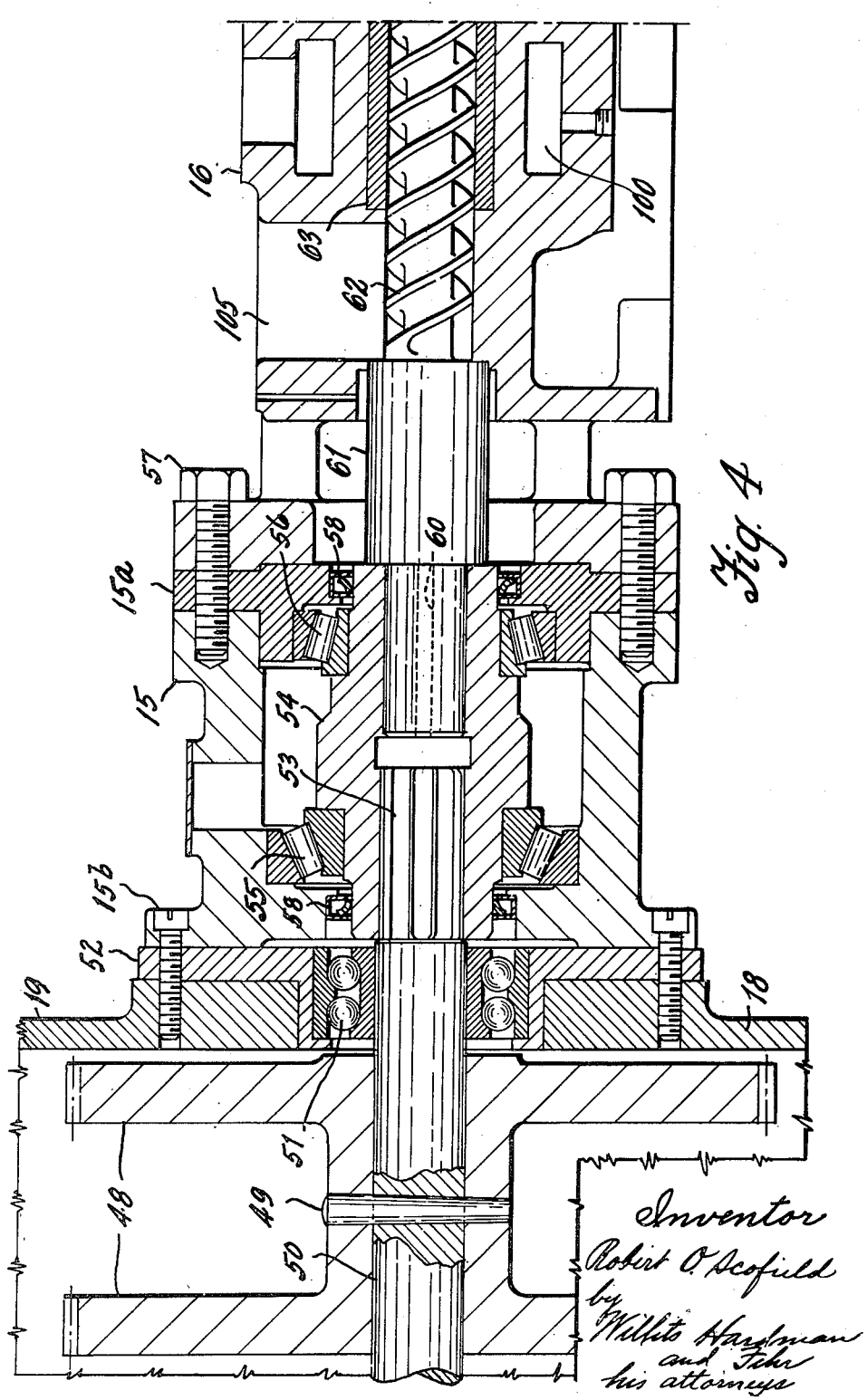

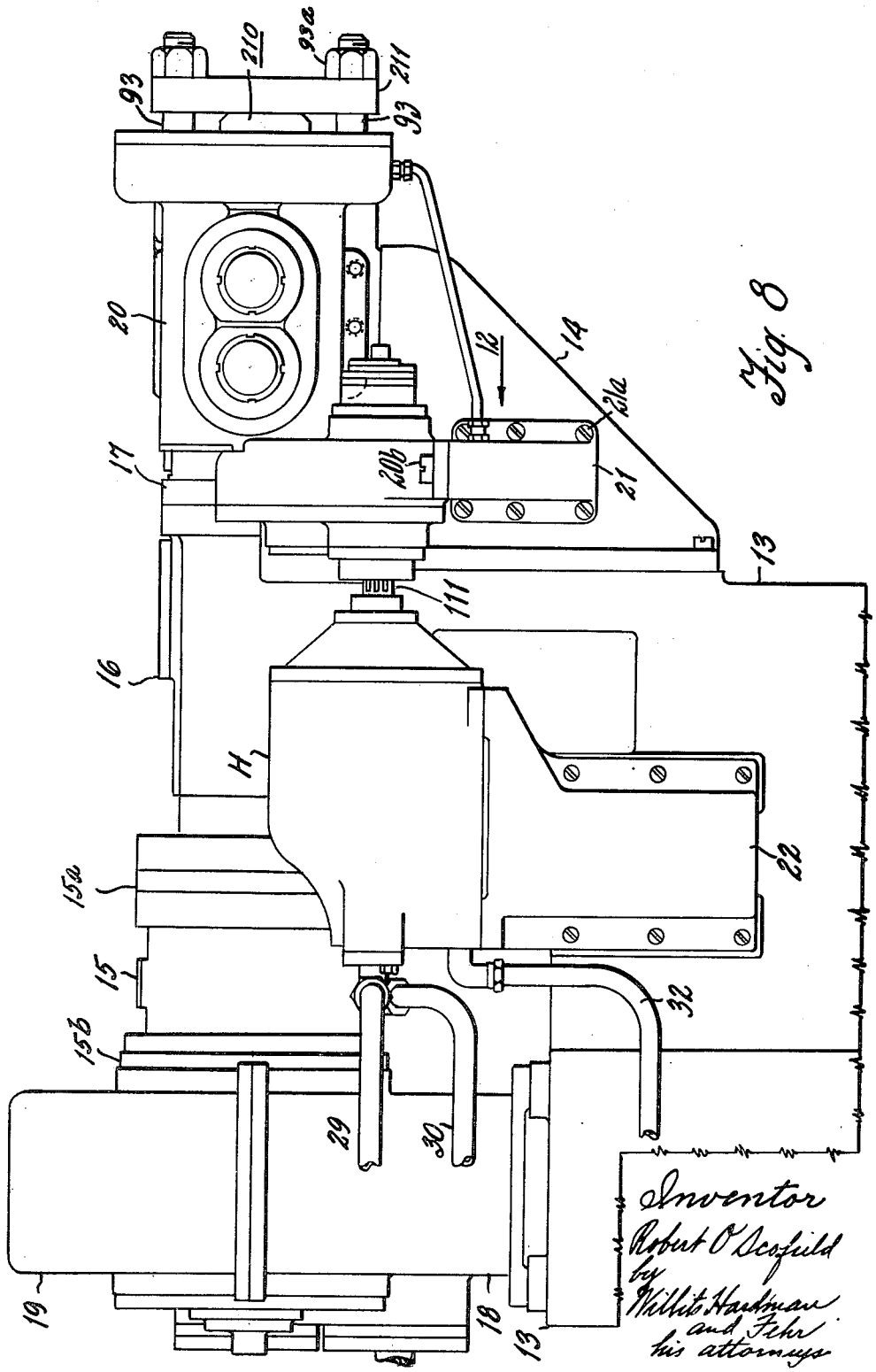

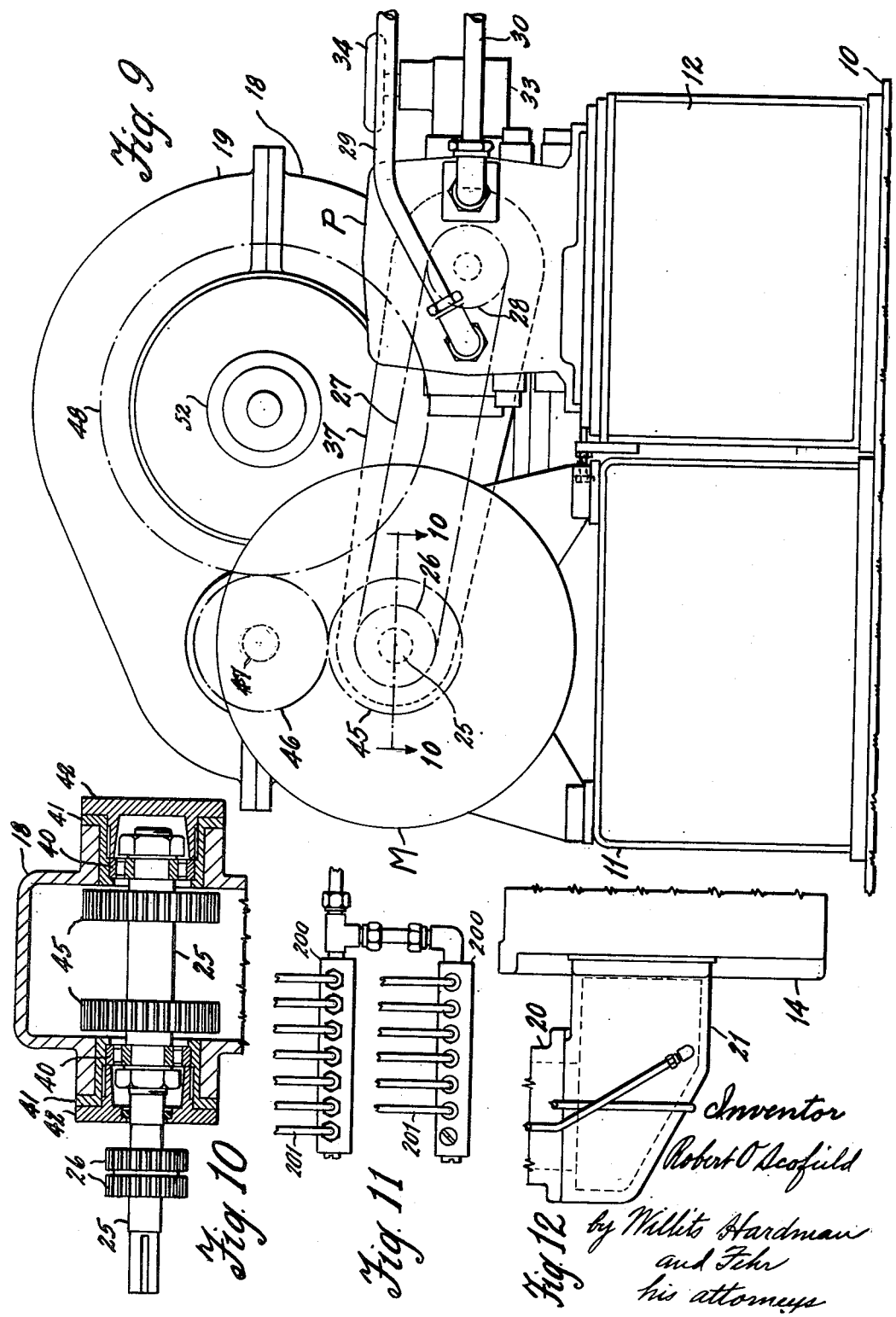

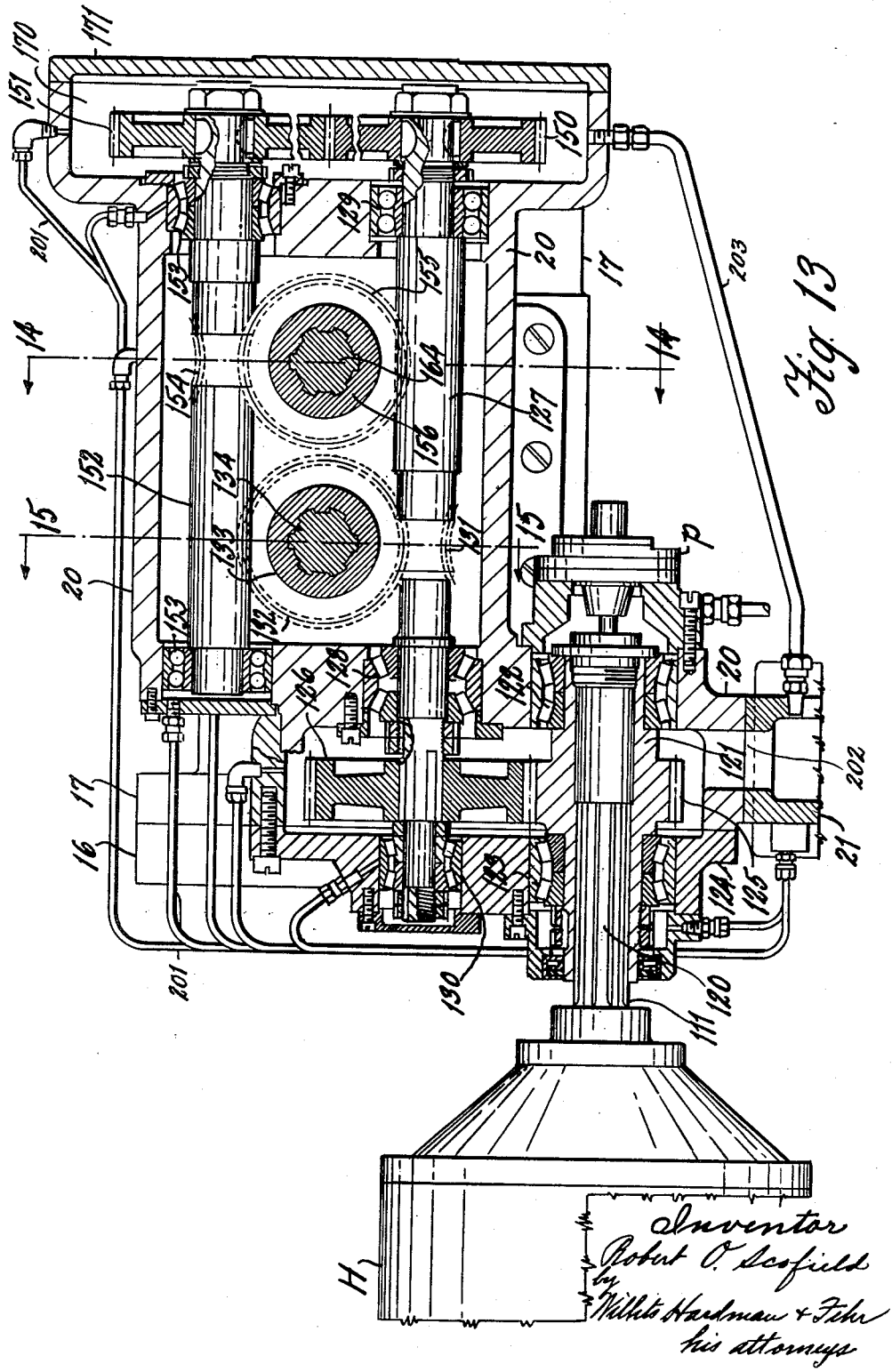

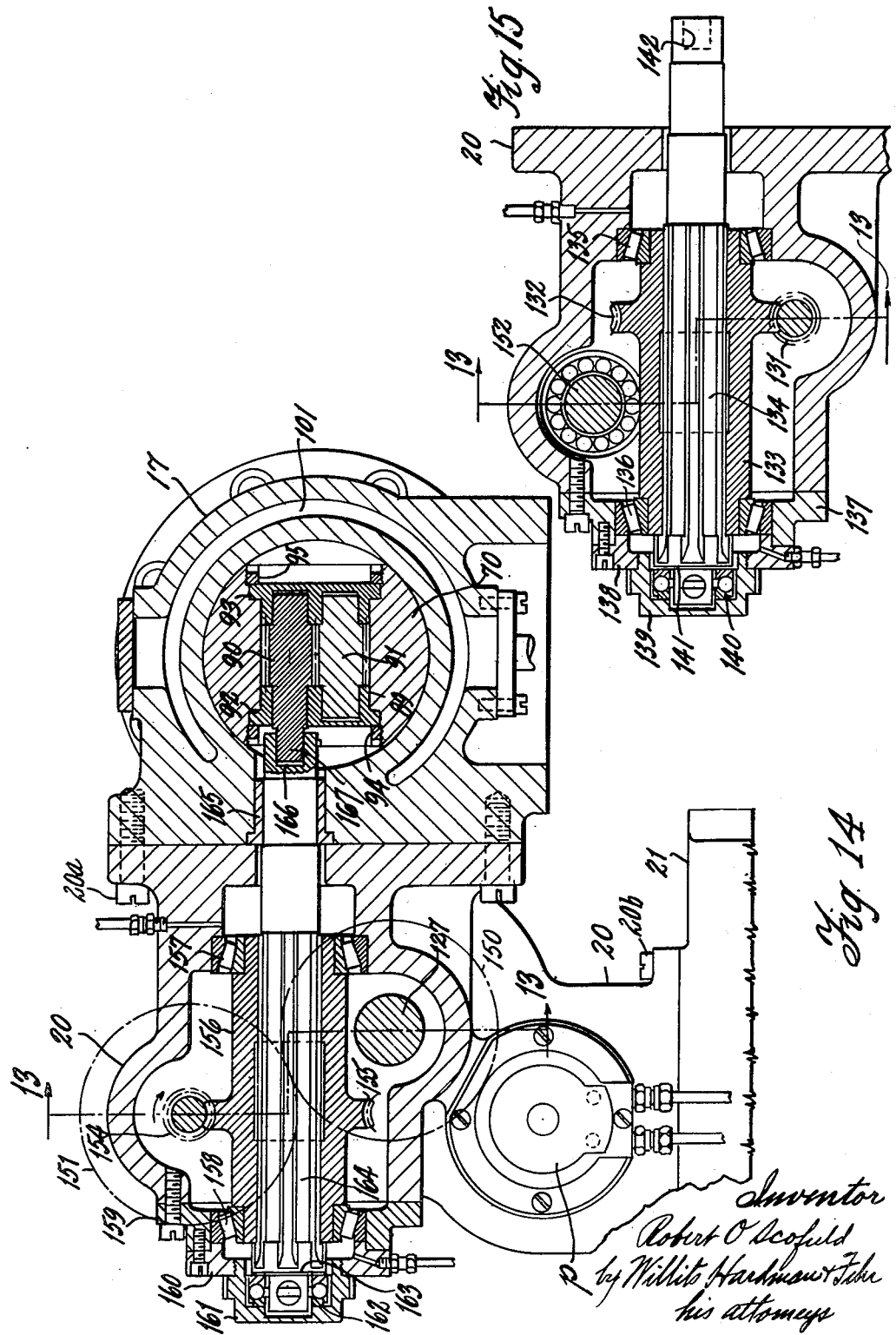

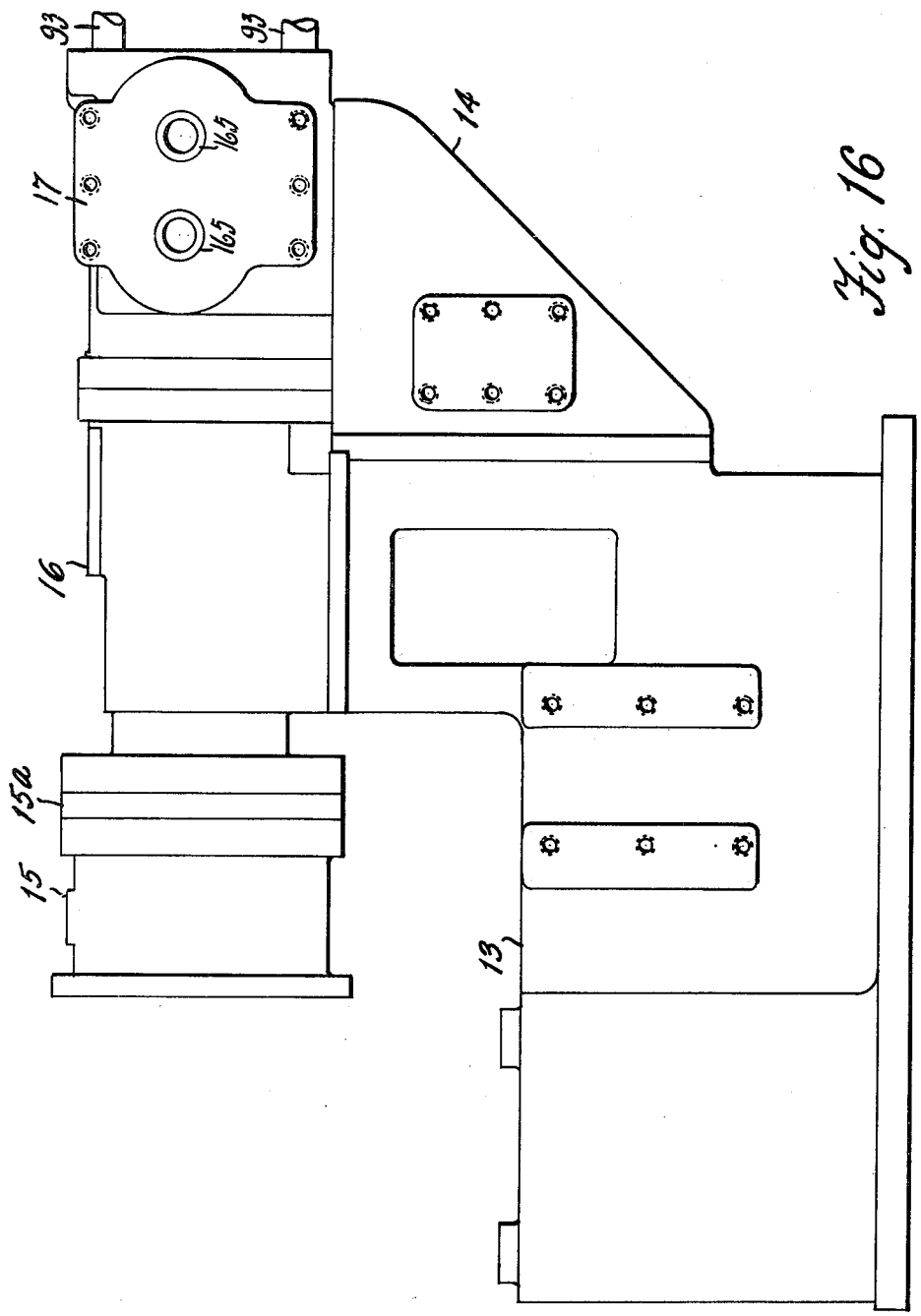

July 20, 1954 R. O. SCOFIELD 2,683,895
EXTRUDER
Filed July 21, 1950 9 Sheets-Sheet 9

Inventor
Robert O. Scofield
by Willits Hardman + Fehr
his attorneys

Patented July 20, 1954

2,683,895

UNITED STATES PATENT OFFICE 2,683,895

EXTRUDER

Robert O. Scofield, Warren, Ohio, assignor to General Motors Corporation, Detroit, Mich., a corporation of Delaware Application July 21, 1950, Serial No. 175,100

6 Claims. (Cl. 18—13)

This invention relates to the manufacture of insulated wire comprising a metal core and a sheath of plastic material formed around the wire by an extruder.

The object of the invention is to provide an extruding machine having means for preparing the material for use by the extruder head. This object is accomplished by a plurality of heated, material kneading devices located in series relation between a feed screw and the extruder head.

A further object of the invention is to adapt the machine for the preparation of different kinds of material. Therefore the machine provides for adjusting the speed of the kneading devices relative to the speed of the feed screw and for changing the speed relation of the kneading devices.

A further object is to facilitate the cleaning of the machine. Therefore this machine provides a unitary structure containing the kneading devices which can be easily removed from its housing and which can be easily disassembled.

Further objects and advantages of the present invention will be apparent from the following description, reference being had to the accompanying drawings, wherein a preferred embodiment of the present invention is clearly shown.

In the drawings:

Figs. 1 and 2 constitute a plan view of the machine.

Figs. 3 and 4 constitute an enlarged sectional view on line 3—3 of Figs. 1 and 2.

Fig. 5 on the same sheet with Fig. 3, is a fragmentary sectional view on line 5—5 of Fig. 3.

Fig. 6 is a sectional view on line 6—6 of Fig. 3.

Fig. 7 is an enlargement of that portion within circle 7 of Fig. 3.

Fig. 8 is a fragmentary side elevation of the machine in the direction of the arrows 8 of Figs. 1 and 2.

Fig. 9 is an end view in the direction of arrow 9 of Fig. 1.

Fig. 10 is a fragmentary sectional view on line 10—10 of Fig. 9.

Fig. 11 is a view of a lubricating oil distributing manifold.

Fig. 12 is a fragmentary view in the direction of arrow 12 of Fig. 8.

Fig. 13 is an enlarged sectional view on lines 13—13 of Figs. 2, 14 and 15.

Figs. 14 and 15 are sectional views taken, respectively, on lines 14—14 and 15—15 of Fig. 13.

Fig. 16 is a side view of an assembly of various housing.

Figure 17:
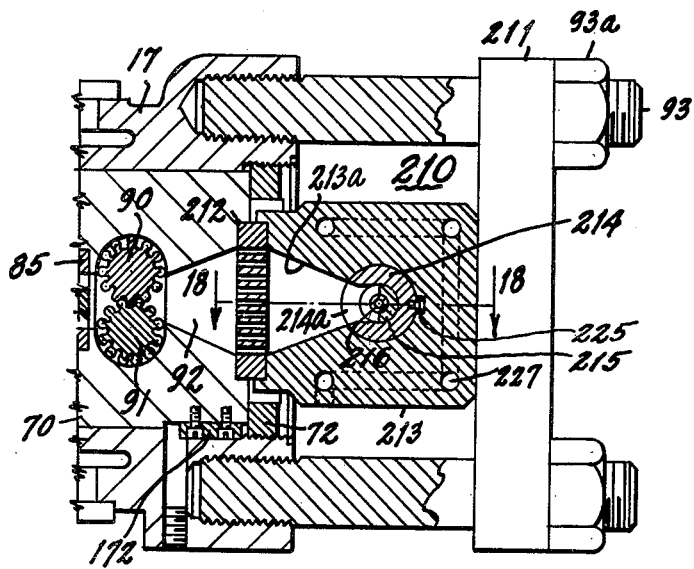

Fig. 17 is a continuation of Fig. 3 to show the extruder head.

Figure 18:
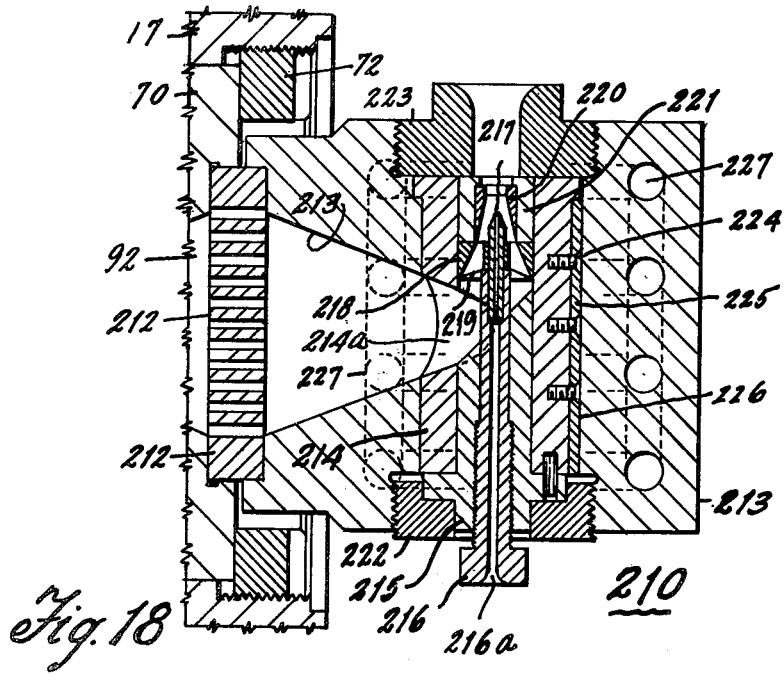

Fig. 18 is an enlarged sectional view on line 18—18 of Fig. 17.

Referring to Fig. 9, a base plate 10 supports a frame 11 which supports an electric motor M which drives a shaft 23 (Fig. 1) connected by a coupling 24 with a shaft 25 connected with a gear 26 connected by a chain 27 (Fig. 1) with a gear 28 which drives an oil pump P which pumps oil from a tank 12 which supports it and forces oil through pipes 29 and 30 to an hydraulic motor H (Figs. 1 and 2) connected by an oil return pipe 32 with tank 12. Pump P is of the piston type and the displacement of the piston can be varied by adjusting a mechanism in cam 33 (Fig. 9) by turning a handwheel 34 in order to vary the relation of the speed of the hydraulic motor H relative to the speed of electric motor M which drives the pump P. A guard 37 encloses the chain 27 and gears 26 and 28.

Referring to Figs. 8 and 16, a base frame 13 supports a bracket 14 and a feed screw housing 16. Bracket 14 supports a kneader housing 17 attached to housing 16. Housing 16 supports a shaft coupling housing 15 and a spacer plate 15a. A transmission housing comprising members 18 and 19 (Fig. 8) is supported by base 13 and supports a plate 52 and one end of the housing 15.

The housing 18, 19 is part of a feed-screw power transmission sub-assembly including shaft 25 (Fig. 10), gear 26, shaft bearings 40, bearing sleeves 41 and bearing retainer caps 42.

Figure 1:
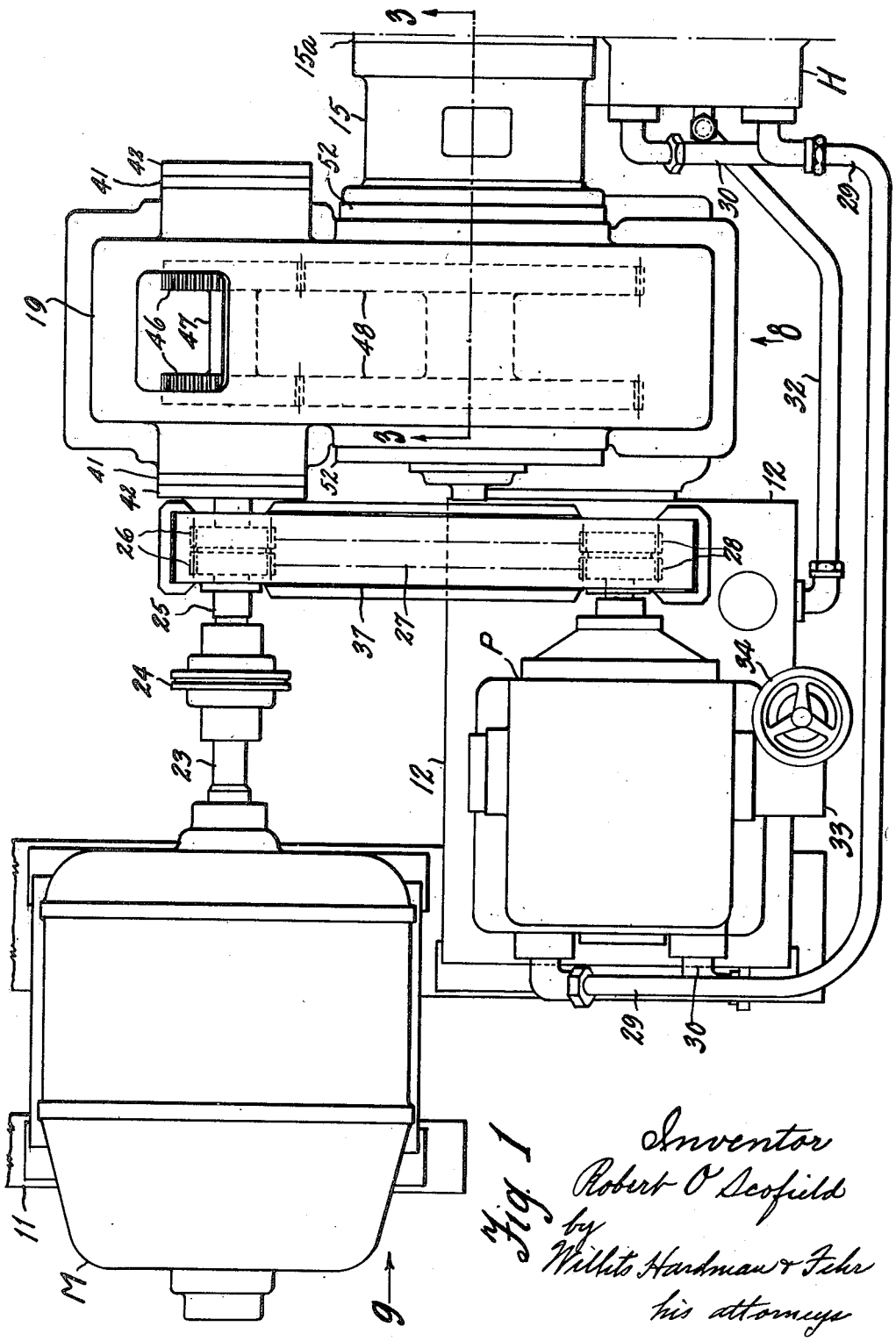

Shaft 25 is connected with gears 45 which mesh with gears 46 (Figs. 9 and 1) connected with a shaft 47 supported by housing 18, 19 in a manner similar to that by which said housing supports shaft 25. Gears 46 (Fig. 1) mesh with gears 48 which, as shown in Fig. 4, is connected by a pin 49 with a shaft 50 journaled in bearings 51 supported by a plate 52 attached to housing 18, 19 as shown in Figs. 1 and 4. Shaft 50 has splines 53 received by internal splines of a coupling 54 journaled in bearings 55 and 56 mounted, respectively, in the housing 15 and in a plate 15a. Screws 15b attach housing 15 and the adjacent plate 52 to the housing 18, 19. Screws 57 attach housing 16 and plate 15a to housing 15. Housing 15, coupling shaft 54, bearings 55 and 56, plate 15a and seal rings 58 provide a shaft coupling sub-assembly unit.

Coupling 54 is connected by a key 60 with a shaft 61 which provides a feed screw 62 within a hard metal sleeve 63 located within housing 16 and extending within a sleeve 64 (Fig. 3) within the housing 17. Housing 16, shaft 61 and tube 63 provide the feed screw sub-assembly. Housing 16 provides a material receiving hopper 105

(Fig. 4) and passages 100 for receiving a heating medium such as steam.

The sleeve 64 (Fig. 3) has a recess which receives a screen 66 and a perforated plate 67 retained by a cylinder 70 received by a cylindrical bore 71 in a housing 17 and retained therein by a nut 72. Cylinder 70 provides a pocket 73 which receives meshing gears 74 and 75 of a kneader A. The material to be worked is forced by the screw 62 through the screen 66 and perforated plate 67 and through distributing passages 76 to the kneader A from which the material is discharged through duct 77 to a funnel shaped nut 78 (Fig. 7) which retains a block 79 having a metering orifice 80 within a cylinder 81 located in a cross bore 82 in cylinder 70. Cylinder 81 is retained by nuts 83 screwed into cylinder 70. After the material passes the orifice 80, it is distributed again through ducts 84 provided by a disc 85 received by a recess in cylinder 70 and retained therein by cylinder 81. Cylinder 81 has a slot 86 to permit removal of cylinder 81 from cylinder 70 (after cylinder 70 has been withdrawn from housing 19) while disc 85 remains assembled with the cylinder 70. After removal of cylinder 81 from cylinder 70, the disc 85 can be removed. Disc 85 locates the cylinder 81 so that block 79 is aligned with duct 77.

The material is forced through the ducts 84 of disc 85 into a pocket 89 which receives meshing gears 90 and 91 of kneader B. From kneader B, the work material passes through the flaring opening 92 to an extruder head 210 (Fig. 2) clamped to housing 17 by a bar 211 engaged by nuts 93a threaded on screws 93. The housing 17 is provided with steam passages 101 which are connected with a source of steam by pipes, such as 102 (Fig. 3) threaded into plates 103 attached to the frame or housing. The material to be kneaded is passed into the housing 16 through the hopper 105 (Fig. 4) and the screw 62 picks the material up and forces it through the tube 63 to the kneaders A and B which pass it to the extruder head 210. The housing 17 and parts supported thereby constitute a kneader sub-assembly which can be removed from the machine without removing other sub-assemblies as will be explained later.

The hydraulic motor H (Figs. 2 and 8) which is supported by a bracket 22 supported by frame 13 drives a shaft 111 which drives mechanism contained in a housing 20 which together with said mechanism constitutes a kneader power transmission sub-assembly unit which is removable from the machine without removing other sub-assemblies.

Referring to Fig. 13, shaft 111 has splines 120 by which it is connected with a tubular shaft 121 journaled in bearings 122 and 123 mounted respectively in housing 20 and a housing cover 124. Shaft 121 provides a gear 125 meshing with a gear 126 connected with a shaft 127 journaled in bearings 128 and 129 mounted in housing 20 and in a bearing 130 mounted in cover 124. Shaft 127 provides a worm 131 which meshes with a worm gear 132 having a hub 133 splinedly connected with a shaft 134 (Fig. 15). Shaft 134 is journaled in bearings 135 and 136 mounted in housing 20 and a ring 137 to which a ring 138 is attached. In the ring 138 there is screwed a plug 139 which receives a thrust bearing 140 engageable with a shoulder 141 of the shaft 134. Shaft 134 has a square socket 142 for receiving the square end of a shaft with which the gear 74 (Fig. 3) is integral.

Shaft 127 (Fig. 13) is connected with a gear 150 which meshes with a gear 151 connected with a shaft 152 journaled in bearings 153 mounted in housing 20. Shaft 152 provides a worm 154 meshing with a worm gear 155 which, as shown in Fig. 14, is integral with a tubular shaft 156 journaled in bearings 157 and 158 mounted, respectively, in housing 20 and a ring 159 to which a ring 160 is attached. A plug 161 screwed into ring 160 supports a thrust bearing 162 for engaging a shoulder 163 of a shaft 164 splinedly connected with shaft 156 and extending through a bearing bushing 165 mounted in housing 17 and providing a square socket 166 which receives the square end of a shaft 167 integral with gear 90 (Fig. 3). Gear 90 and gear 91 meshing therewith are journaled in bearing plates 92 and 93 which close the end of pocket 89 (Fig. 3) and which are retained by nuts 94 and 95 respectively. The construction providing for the support of gears 74 and 75 of kneader A, for the closure of the pocket 73 and for the connection of gear 74 with shaft 134 of Fig. 15 is identical with that just described for supporting closing and driving gears 90 and 91 of kneader B.

Gears 150 and 151 (Fig. 13) are housed in a chamber 170 of housing 20 which is closed by a cover 171. To change the speed relation between kneaders A and B, the cover 171 is removed and gears 150 and 151 are replaced by meshing gears of other diameters.

The cylinder 70 (Fig. 3) is located within the bore 71 of housing 17 by a key 172 attached to cylinder 70 and received by a groove 173 in housing 17 and by a dowel pin 65 attached to sleeve 64 and received by a hole 175 in the left end of cylinder 70.

The cylinder 70 and parts supported thereby can be removed from the bore 71 of housing 65 as a unit. In preparation for such removal, the plug 139 (Fig. 15) and the plug 161 (Fig. 14) are removed and shafts 134 and 164 are retracted from housing 17. The nut 72 (Fig. 3) is removed. The worm or feed screw 62 is rotated in normal direction to cause any material therein to be moved toward the right, thereby causing it to push upon the screen 66, plate 67 and cylinder 70 so that the right end of cylinder 70 will project out beyond the right end of housing 17 from which the extruder head 210 had previously been removed. Thus the screen 66 and plate 67 are removed for cleaning and the parts assembled with cylinder 70 can be removed. After removing the nuts 94 and 95 (Fig. 14), the bearing plates 92 and 93 and the gears 90 and 91 can be disassembled from the cylinder 70. In a similar manner, the gears 74 and 75 and supporting plates are removed. After removing the nut 83 which appears lower as shown in Fig. 3, the cylinder 81 and parts assembled therewith can be removed. After such removal, the disc 85 can be removed. By unscrewing the nut 78 (Fig. 7), the block 79 providing the metering orifice 80, can be removed. Thus all of the parts assembled with cylinder 70 as a unitary structure can be disassembled readily for purpose of cleaning or replacement of worn parts.

The retraction of shaft 134 (Fig. 15) and shaft 164 (Fig. 14) permits removal of the kneader power transmission sub-assembly unit from the machine without requiring removal of the kneader sub-assembly unit or the hydraulic motor H. Housing 20 is detached from housing 17 (Fig. 14) by removing screws 20a; and housing 20 is detached from bracket 21 by removing screws 20b. Then the kneader power transmission sub-assembly unit is removed from the machine by moving housing 20 right (Fig. 8) in a direction parallel to the axis of shaft 111.

Oil for lubricating the mechanism in housing 20 is placed in the bracket 21 which is hollow (Fig. 12). A pump p driven by shaft 121 (Fig. 13) withdraws oil from bracket 21 and forces it to manifold 200 (Fig. 11) and distribution pipes 201 feed oil to said mechanism. Excess oil returns to bracket 21 through a drain duct 202 and a drain pipe 203.

The speed at which the material is moved by the screw 62 depends upon the speed of the screw and the resistance to movement of the material through the screen 66 and plate 67 and also the resistance to movement of the material through ducts 76 (Fig. 3). Obviously resistance must be present in order to effect feeding of the material by the screw 62 since there must be slippage between the screw and material in order to effect a feeding operation. The extent to which the material is worked by a kneader A depends upon its speed of rotation and the resistance to flow through the metering orifice 80 which has a diameter such that the particular material being handled will receive the proper amount of kneading action. In order that the material will be effectively kneaded by the kneader B, there is resistance to movement of the material through the duct 92 since a strainer plate 212 and the extruder head 210 (Figs. 17 and 18) attached to housing 17 offer resistance to flow of material as it is extruded around a wire. For some types of material it may be advantageous to rotate gears 90 and 91 of kneader B at a rate less than the rate of rotation of gears 74 and 75 of kneader A, so that the rate of discharge of material into passage 90 will be somewhat less than the rate at which the material is received into the gear pocket 89.

The machine can be readily adapted for working various kinds of materials by adjusting the speed of the hydraulic motor H so that the relation of kneader speed to feed screw speed can be varied, by adjusting the speed ratio between kneaders A and B and by the substitution of a disc 79 having orifices of different diameters.

The extruder head 219 which, together with the perforated strainer plate 212 are clamped to the housing 17, may be any suitable type such as illustrated in Figs. 17 and 18. As shown, the head 210 comprises a block 213 which supports a bushing 214 which supports a guider holder 215 which supports a wire guider 216 having a central bore 216a through which a wire passes to a guider tip 217 supported by the guider 216 and a bridge 218 supported by the bushing 214. The wire coating material is forced through openings 219 in bridge 218 and through a die 220 supported by a die holder 221 located by bushing 214 in alignment with guider tip 217. Plugs 222 and 223 threaded into block 213 retain extruder head parts in the block 213. Screws 224 secure to bushing 214 a key 225 received by a groove 226 in block 213 to prevent turning of the bushing 214 so that the side opening 214a of bushing 214 remains aligned with the funnel-like opening 213a of block 213. The block 213 is provided with steam receiving passages 227.

While the embodiment of the present invention as herein disclosed, constitutes a preferred form, it is to be understood that other forms might be adopted.

What is claimed is as follows:

1. An extruder comprising an extruder head which forms a sheath of the material around a wire and apparatus for preparing material for use by the head, said apparatus comprising a feed screw, power means for rotating the screw, two kneading devices in series with the screw and extruder head, each device comprising a pair of meshing gears, ducts distributing material discharged by the screw to the first of the devices, a duct providing a restriction to passage of material from the first kneading device, ducts distributing material passing through the restricted duct to the second kneading device, a duct through which material passes from the second kneading device to the extruder head which limits the rate of material flow through the last duct, a frame having a recess extending from the feed screw to an open end of the frame which is adapted to receive an extruder, a housing received by the frame and enclosing the ducts and providing gear receiving recesses, members received within the housing for closing the ends of the recesses and providing bearings for the gears, detachable means within the housing for securing the members in position, disconnectible means for transmitting rotary motion from the power means to the gears and comprising two longitudinally movable power shafts providing, respectively, couplings with gears of the two kneading devices, said shafts being extendable into the frame recess to effect coupling with the gears and retractable from the frame recess to effect uncoupling, the housing and parts supported thereby being removable as a unit from the frame recess when the shafts are retracted and the extruder head is detached from the frame, and detachable means for securing the housing within the frame recess.

2. An extruder comprising an extruder head which forms a sheath of the material around a wire and apparatus for preparing material for use by the head, said apparatus comprising a feed screw, power means for rotating the screw, two kneading devices in series with the screw and extruder head, each device comprising a pair of meshing gears, ducts distributing material discharged by the screw to the first of the devices, a duct providing a restriction to passage of material from the first kneading device, ducts distributing material passing through the restricted duct to the second kneading device, a duct through which material passes from the second kneading device to the extruder head which limits rate of material flow through the last duct, a frame having a recess extending from the feed screw to an open end of the frame which is adapted to receive the extruder head, a housing received by the frame providing gear receiving recesses, members received within the housing for closing the ends of the recesses and providing bearings for the gears, detachable means within the housing for securing the members in position, said housing providing, between the gear receiving recesses, a third recess extending cross-wise of the frame recess, a body in said third recess, detachable means for retaining the body in the third recess, a passage provided by the body for connecting the gear receiving recesses, a block located in said passage and providing the restricted duct, a member providing the distributing ducts to the second kneading device and retained in position by said body and locating the body in the third recess, said housing providing the distributing ducts leading to the first kneading device and the duct leading from the second kneading device, means for transmitting rotary motion from the power means to the gears and comprising two longitudinally movable power shafts providing, respectively, couplings with gears of the two kneading devices, said shafts being extendable into the frame recess to effect coupling with the gears and retractable from the frame recess to effect uncoupling, the housing and parts supported thereby being removable as a unit from the frame recess when the shafts are retracted and the extruder head is detached from the frame, and detachable means for securing the housing within the frame recess.

3. In apparatus for preparing material for use by an extruder head, the combination comprising a material receiving hopper, a screw for feeding material from the hopper, rotary kneading means receiving material from the screw and passing it to an extruder, an electric motor, a variable displacement pump for pressurizing hydraulic fluid, mechanism for connecting the motor with the screw and the pump, a pressure fluid operated motor connected with the pump and operating a shaft and mechanism connecting the fluid motor shaft with the kneading means.

4. In apparatus for preparing material for use by an extruder head, the combination comprising a frame, a rotary kneader enclosed thereby, said kneader having a rotary shaft providing a coupling member within the frame, a motor having a shaft for driving the shaft of the kneader, said motor shaft being located at a right angle to the kneader shaft, a housing attached to the frame, a first shaft within the housing and having a coupling connection with the motor shaft which is disconnected by moving the housing in a direction axially of the motor shaft, a second shaft supported by the housing in alignment with the kneader and mounted for axial movement and providing a coupling engaged by the kneader shaft coupling when said second shaft is advanced into the frame and gearing supported by the housing for connecting said first and second shafts, said housing and the shafts and mechanism supported thereby being removable as a unit from the frame after the housing has been disconnected from the frame and the second shaft has been retracted from the frame.

5. In apparatus for preparing material for use by an extruder head, the combination comprising a base frame, a feed screw sub-assembly supported by the base frame and comprising a housing, a material receiving hopper provided by the housing, a tube in the housing receiving material from the hopper, a shaft extending exterior to the housing and located within the tube and providing therein a feed screw; a kneader sub-assembly and comprising a housing, supported by the frame and attached to the feed screw sub-assembly housing, a rotary kneader in the kneader housing and having a shaft providing a shaft coupling member; a kneader driving motor supported by the base frame having a shaft; a kneader transmission sub-assembly comprising a housing supported by the frame and attached to the kneader housing, a shaft providing a coupling with the kneader motor shaft, a shaft providing a coupling with the kneader shaft and mechanism connecting the shafts supported by the kneader transmission housing; a screw shaft coupling sub-assembly comprising a housing attached to the screw shaft housing and a shaft coupling rotatably supported thereby and receiving and providing a coupling with the screw shaft; and a power transmission sub-assembly and comprising a housing supported by the base frame and attached to the housing of the screw coupling, a power input shaft having a coupling for connection with the shaft of a driving motor, a power output shaft having a spline connection with the coupling in the housing of the screw shaft coupling sub-assembly and gearing connecting the shafts supported by the housing of the power transmission sub-assembly.

6. An extruder comprising an extruder head which forms a sheath of the material around a wire, and apparatus for preparing material for use by the head, said apparatus comprising a feed screw, power means for rotating the screw, two rotary, material kneading devices in series with the screw and the extruder head, variable speed power means for operating the devices, means for changing the speed of operation of said kneading devices relative to the speed of rotation of the feed screw, and means for heating the screw and devices.

References Cited in the file of this patent

UNITED STATES PATENTS

| Number | Name | Date |
|---|---|---|
| 1,302,484 | Stratton et al. | Apr. 29, 1919 |
| 1,595,470 | Johnson | Aug. 10, 1926 |